United States Patent
Yu et al.

(10) Patent No.: US 12,330,229 B1
(45) Date of Patent: Jun. 17, 2025

(54) SUSPENDED-TYPE SPOT WELDING DEVICE CONVENIENT FOR WELDING AND ASSEMBLING OF VARIOUS VEHICLE MODELS

(71) Applicant: Jilin University, Jilin (CN)

(72) Inventors: Zhenglei Yu, Jilin (CN); Lixin Chen, Jilin (CN); Yiwen Zhang, Jilin (CN); Zezhou Xu, Jilin (CN); Shan Jiang, Jilin (CN); Long Ma, Jilin (CN); Lei Dong, Jilin (CN); Delong Gao, Jilin (CN); Linsen Song, Jilin (CN); Shouxin Ruan, Jilin (CN); Xin Li, Jilin (CN); Lidong Gu, Jilin (CN); Jing Jiao, Jilin (CN); Hongbo Liu, Jilin (CN)

(73) Assignee: Jilin University, Changchun (CN)

( * ) Notice: Subject to any disclaimer, the term of this patent is extended or adjusted under 35 U.S.C. 154(b) by 0 days.

(21) Appl. No.: 19/019,447

(22) Filed: Jan. 13, 2025

(30) Foreign Application Priority Data

Apr. 8, 2024 (CN) .......................... 202410411960.0

(51) Int. Cl.
*B23K 11/11* (2006.01)
(52) U.S. Cl.
CPC ..................... *B23K 11/11* (2013.01)
(58) Field of Classification Search
CPC .............................. B23K 11/11; B23K 11/115

USPC ....................................................... 219/91.1
See application file for complete search history.

(56) References Cited

U.S. PATENT DOCUMENTS

| | | | |
|---|---|---|---|
| 2013/0037528 A1* | 2/2013 | Ogake | B23K 11/36 219/127 |
| 2018/0085863 A1* | 3/2018 | Lloyd | B21J 15/025 |

FOREIGN PATENT DOCUMENTS

| | | |
|---|---|---|
| CN | 205111051 Y | 3/2016 |
| CN | 211119244 Y | 7/2020 |
| CN | 211564838 Y | 9/2020 |

* cited by examiner

*Primary Examiner* — Chris Q Liu
*Assistant Examiner* — James F Sims, III

(57) ABSTRACT

The present disclosure provides a suspended-type spot welding device convenient for welding and assembling of various vehicle models, falling within the technical field of welding. A suspension frame, a rotation piece, a spot welding machine body, a first electrode holder and a second electrode holder are included. According to the present disclosure, by approaching a welding seam with a camera, a position of the welding seam is displayed by a display. Under the action of a balancing weight, a position of the display is always kept above, which is convenient for workers to know the position of the welding seam through the display at any time and avoids the display from moving with a spot welding machine body, thus facilitating the workers to weld the welding seam.

4 Claims, 8 Drawing Sheets

SUSPENDED-TYPE SPOT WELDING DEVICE CONVENIENT FOR WELDING AND ASSEMBLING OF VARIOUS VEHICLE MODELS

CROSS-REFERENCE TO RELATED APPLICATION

This application claims priority of Chinese Patent Application No. 202410411960.0, filed on Apr. 8, 2024, the entire contents of which are incorporated herein by reference.

TECHNICAL FIELD

The present disclosure relates to the technical field of welding, and in particular to a suspended-type spot welding device convenient for welding and assembling of various vehicle models.

BACKGROUND

A suspended-type spot welding machine, referred to as a suspension welding machine, serves for resistance welding. Resistance welding is a method of welding by applying pressure through electrodes after the workpieces are combined and using the resistance heat generated by the current passing through a contact surface of a joint and an adjacent area. Suspension welding is a processing mode in which the workpiece remains stationary and the electrode holder moves. It is mainly used for welding materials such as low carbon steel, low alloy steel and stainless steel, which cannot be or inconvenient to be welded by general fixed welding machines. A suspended-type spot welding machine is widely used in automobile, rolling stock and security door industries.

In the prior art, it is necessary to manually control the movement of the suspended-type spot welding machine to perform spot welding on automobile parts. The welding structures and welding positions of parts of different vehicle models will be different. During welding, the welding seams and welding points of certain vehicle models are difficult to observe because the welded objects are inconvenient to move, which leads to deviation in spot welding and affects the spot welding effect.

To sum up, it is necessary to develop a suspended-type spot welding device convenient for welding and assembling of various vehicle models which can clearly see the welding seam and facilitate spot welding.

SUMMARY

To overcome the disadvantage that it is difficult for workers to see the welding seam clearly in the prior art, and affects the spot welding effect, the present disclosure provides a suspended-type spot welding device convenient for welding and assembling of various vehicle models which can clearly see the welding seam and facilitate spot welding.

To achieve the above object, the present disclosure provides the following solutions. A suspended-type spot welding device convenient for welding and assembling of various vehicle models includes a suspension frame, a rotation piece, a spot welding machine body, a first electrode holder, a second electrode holder, a camera, an electric wire, a second fixing frame, a display and a limit assembly. The suspension frame is rotatably connected to the rotation piece, the spot welding machine body is rotatably connected inside the rotation piece, the spot welding machine body is fixedly connected to the first electrode holder, and one side of the spot welding machine body close to the first electrode holder is rotatably connected to the second electrode holder; the first electrode holder is mounted with the camera for shooting a welding seam, one side of the spot welding machine body close to the rotation piece is fixedly connected to the second fixing frame, and the display for displaying the welding seam condition and position is rotatably connected inside the second fixing frame; and the display includes a rotation ring and a display screen, the electric wire is connected between the display and the camera, and the spot welding machine body is arranged with the limit assembly for limiting the display.

Alternatively, the limit assembly includes a first fixing frame, a winding wheel, a balancing weight and a driving assembly; the balancing weight for limiting the display is fixedly connected to a bottom of the rotation ring of the display; and the first fixing frame is fixedly connected to a top of the spot welding machine body, the first fixing frame is rotatably connected to the winding wheel for winding the electric wire, the electric wire is wound on the winding wheel, and the first fixing frame is arranged with the driving assembly for avoiding excessive pay-off of the electric wire.

Alternatively, the driving assembly includes a motor, a rotatable piece and a counting sensor; and the motor is mounted inside the first fixing frame, an output shaft of the motor is fixedly connected to the rotatable piece, the rotatable piece is in contact with an inner wall of the winding wheel and used for driving the winding wheel to rotate, the rotatable piece is connected to the counting sensor, and the counting sensor is electrically connected to the motor.

Alternatively, the suspended-type spot welding device convenient for welding and assembling of various vehicle models further includes a trigger frame, a fixing block, a first spring, a third fixing frame, a black lens and a torsional spring; the first electrode holder is fixedly connected to the fixing block, the trigger frame is slidably connected inside the fixing block, and the first spring is connected between the trigger frame and the fixing block; and the camera is fixedly connected to the third fixing frame, the third fixing frame is rotatably connected to the black lens for protecting the camera, the trigger frame presses the black lens, and the torsional spring is connected between the black lens and the third fixing frame.

Alternatively, the trigger frame is in contact with the black lens, the trigger frame may be separated from the black lens through movement, and the black lens rotates to block the camera under the action of the torsional spring.

Alternatively, the suspended-type spot welding device convenient for welding and assembling of various vehicle models further includes a fourth fixing frame, a wiping piece and a second spring; and the third fixing frame is fixedly connected to the fourth fixing frame, the fourth fixing frame is slidably connected to the wiping piece for wiping the black lens, and the second spring is connected between the wiping piece and the fourth fixing frame.

Alternatively, the wiping piece is in contact with a bottom of the black lens, the black lens rotates, and the wiping piece moves along with the black lens to erase welding slag attached to the bottom of the black lens.

Alternatively, the suspended-type spot welding device convenient for welding and assembling of various vehicle models further includes a connecting frame and a rubber block; and the connecting frame is fixedly connected to an end of the trigger frame, and one side of the rotation piece close to the connecting frame is slidably connected to the rubber block for limiting the spot welding machine body.

Alternatively, the rubber block may move to contact with the spot welding machine body for increasing the friction between the rubber block and the spot welding machine body.

Alternatively, the suspended-type spot welding device convenient for welding and assembling of various vehicle models further includes dust cleaning brushes, and a top of the second fixing frame is fixedly connected to the symmetrically arranged dust cleaning brushes for wiping the display.

The present disclosure has at least one advantage as follows: According to the present disclosure, by positioning a camera close to a welding seam, a position of the welding seam is displayed by a display. Under the action of a balancing weight, a position of the display is always kept above, which is convenient for workers to know the position of the welding seam through the display at any time and avoids the display from moving with a spot welding machine body, thus facilitating the workers to weld the welding seam.

A lower part of the camera is blocked by the rotation of the black lens, so that the camera can be protected by the black lens. In this way, the camera can be protected from being damaged by spatter of welding slag generated during welding.

Through the contact between the wiping piece and the black lens, the wiping piece can erase the welding slag adhered to the bottom of the black lens during the rotation of the black lens, to avoid that too much welding slag will affect the clarity of the black lens, and then affect the clarity of camera shooting.

Through the moving of the connecting frame, the rubber block is pushed upward to contact with the spot welding machine body, so that the spot welding machine body can be limited under the action of the rubber block, and the rotation of the spot welding machine body is avoided from affecting the welding quality.

By rotating the display to be in contact with the dust cleaning brushes, the dust attached to the display can be cleaned under the action of the dust cleaning brushes, so that it is unnecessary for workers to manually clean the display, and the clarity of the display is ensured to prevent the workers from seeing the position of the welding seam unclearly.

Figure 1:
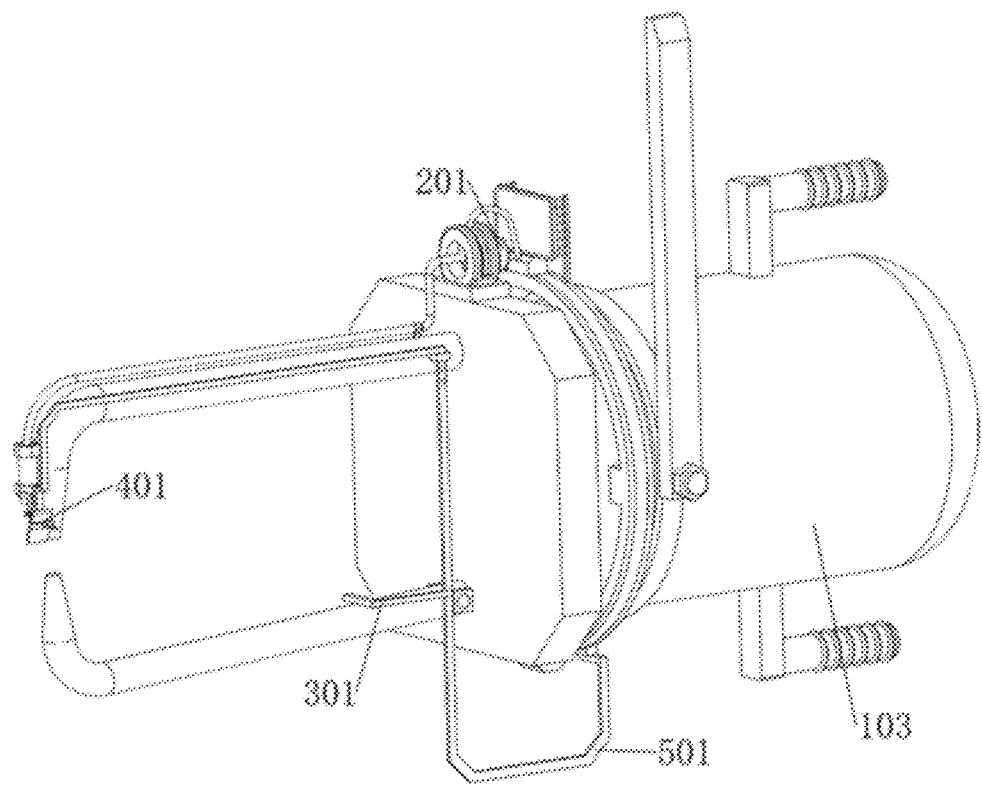
FIG. 1 is a schematic diagram of a three-dimensional structure of the present disclosure.
Figure 2:
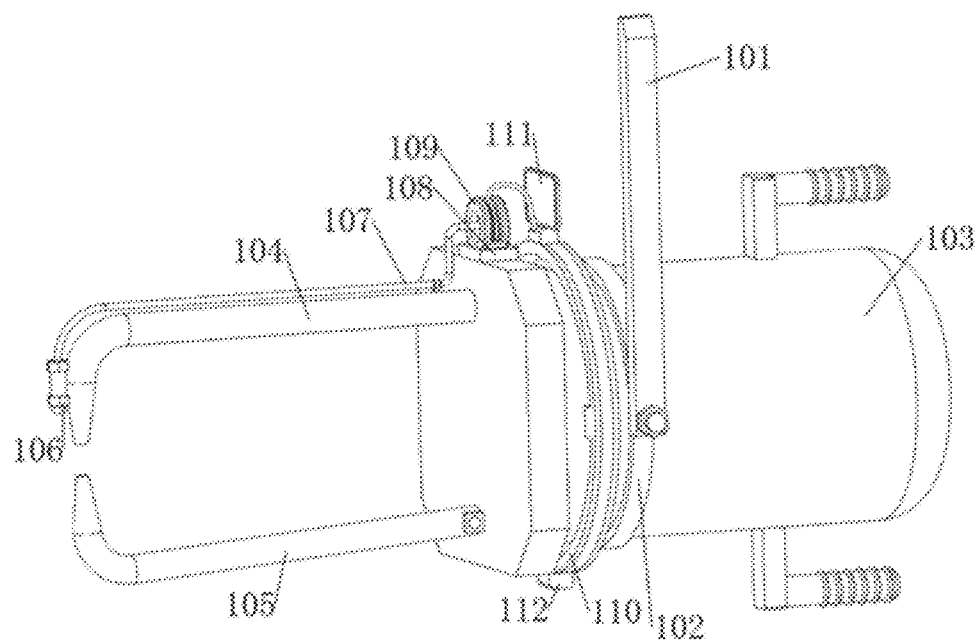
FIG. 2 is a schematic diagram of a three-dimensional structure of a spot welding machine body, a first electrode holder, a second electrode holder and other parts of the present disclosure.
Figure 3:
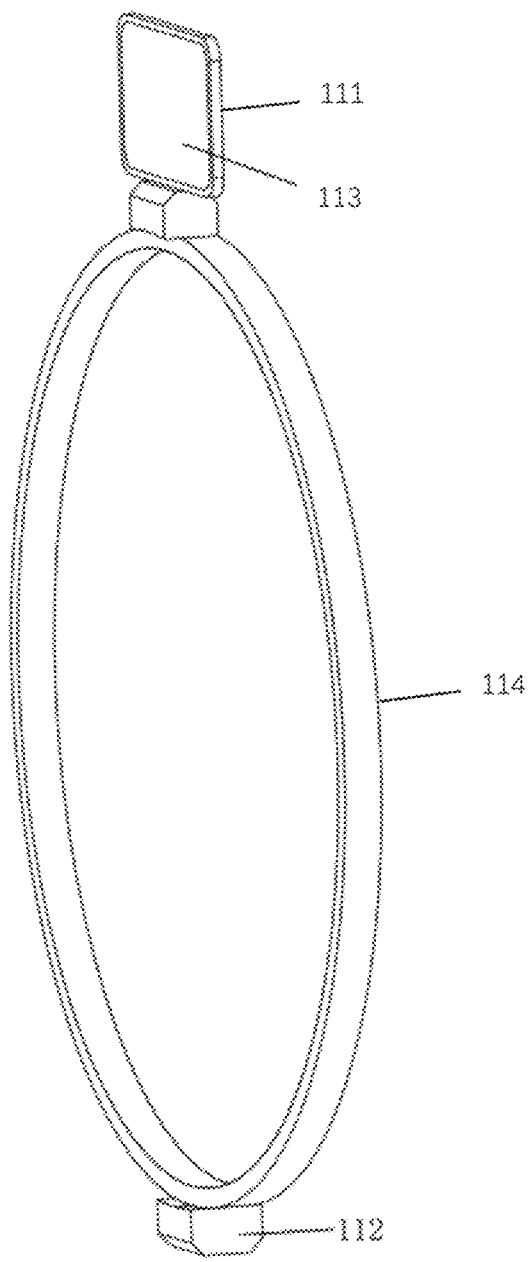
FIG. 3 is a schematic diagram of a three-dimensional structure of a display and a balancing weight of the present disclosure.

Reference numerals and denotations thereof: 101—suspension frame, 102—rotation piece, 103—spot welding machine body, 104—first electrode holder, 105—second electrode holder, 106—camera, 107—electric wire, 108—first fixing frame, 109—winding wheel, 110—second fixing frame, 111—display, 112—balancing weight, 201—motor, 202—rotatable piece, 203—counting sensor, 301—trigger frame, 302—fixing block, 303—first spring, 304—third fixing frame, 305—black lens, 306—torsional spring, 401—fourth fixing frame, 402—wiping piece, 403—second spring, 501—connecting frame, 502—rubber block, and 601—dust cleaning brush.

DETAILED DESCRIPTION

Reference herein to example means that a particular feature, structure, or characteristic described in connection with the example may be included in at least one example of the present disclosure. The appearances of the phrase in various places in the specification are not necessarily all referring to the same example, nor are separate or alternative examples mutually exclusive of other examples. It is understood explicitly and implicitly by those skilled in the art that the examples described herein can be combined with other examples.

Example 1 of the Present Disclosure

A suspended-type spot welding device convenient for welding and assembling of various vehicle models, referring to FIGS. 1-5, includes a suspension frame 101, a rotation piece 102, a spot welding machine body 103, a first electrode holder 104, a second electrode holder 105, a camera 106, an electric wire 107, a second fixing frame 110, a display 111 and a limit assembly. The suspension frame 101 is rotatably connected to the rotation piece 102, and the spot welding machine body 103 is rotatably connected inside the rotation piece 102. A left upper side of the spot welding machine body 103 is fixedly connected to the first electrode holder 104, and a left lower side of the spot welding machine body 103 is rotatably connected to the second electrode holder 105. A left part of the first electrode holder 104 is mounted with the camera 106 for shooting a welding seam, a left side of the spot welding machine body 103 is fixedly connected to the second fixing frame 110, and the display 111 is rotatably connected inside the second fixing frame 110. The display 111 includes a rotation ring 114 and a display screen 113 and is used for displaying the condition and position of the welding seam shot by the camera 106. The camera 106 displays the position of the welding seam shot through the display 111, so that workers can weld the welding seam to prevent welding deviation. The electric wire 107 is connected between the display 111 and the camera 106. The spot welding machine body 103 is arranged with the limit assembly for limiting the display 111.

The limit assembly includes a first fixing frame 108, a winding wheel 109, a balancing weight 112 and a driving assembly; and the balancing weight 112 for limiting the display 111 is fixedly connected to a bottom of the rotation ring 114 of the display 111. The display 111 is always positioned directly above under the action of the balancing weight 112, so that workers can know the position of the welding seam at any time through the display 111. The first fixing frame 108 is fixedly connected to a top of the spot welding machine body 103, the first fixing frame 108 is rotatably connected to the winding wheel 109 for winding the electric wire 107, the electric wire 107 is wound on the winding wheel 109, and the first fixing frame 108 is arranged with the driving assembly for avoiding excessive pay-off of the electric wire 107.

The driving assembly includes a motor 201, a rotatable piece 202 and a counting sensor 203; and the motor 201 is mounted inside the first fixing frame 108, a left side of an output shaft of the motor 201 is fixedly connected to the rotatable piece 202, the rotatable piece 202 is made of rubber, is in contact with an inner wall of the winding wheel 109 and is used for driving the winding wheel 109 to rotate, a left side of the rotatable piece 202 is connected to the counting sensor 203, and the counting sensor 203 is electrically connected to the motor 201. The rotation of the winding wheel 109 drives the rotation piece 202 and the counting sensor 203 to rotate, so that the counting sensor 203 can detect the number of turns of the winding wheel 109, and the pay-off amount of the winding wheel 109 to the electric wire 107.

To ensure that the workers can clearly see the welding seam during spot welding, and ensure the welding effect of spot welding, during welding, the workers manually grasp the spot welding machine body 103 and control the first electrode holder 104 and the second electrode holder 105 to be close to an object to be welded. The first electrode holder 104 drives the camera 106 to be close to the welding seam, and then the workers can see the welding seam through the display 111, so that it is convenient for the workers to weld the welding seam, thus ensuring the welding effect and avoiding welding deviation. When the workers need to adjust angles of the first electrode holder 104 and the second electrode holder 105, the spot welding machine body 103 is rotated for adjustment, and the display 111 is always positioned directly above under the action of the balancing weight 112, so that the worker can conveniently know the position of the welding seam through the display 111 at any time, and the display 111 is avoided from moving with the spot welding machine body 103. Therefore, it is convenient for the workers to weld the welding seam. During the rotation of the spot welding machine body 103, the first fixing frame 108 and the winding wheel 109 are driven to rotate, and the winding wheel 109 is rotated to pay off the electric wire 107 under the action of the balancing weight 112, so that it can be avoided that the electric wire 107 is not long enough to affect the position adjustment of the first electrode holder 104 and the second electrode holder 105 driven by the spot welding machine body 103. The rotatable piece 202 and the counting sensor 203 are driven to rotate along with the rotation of the winding wheel 109, so that the counting sensor 203 can detect the number of turns of the winding wheel 109, thus being able to detect the pay-off amount of the electric wire 107 by the winding wheel 109. When the pay-off amount of the winding wheel 109 reaches a certain level, the electric wire 107 will be wound around the spot welding machine body 103, and the motor 201 is controlled to start. An output shaft of the motor 201 drives the rotatable piece 202 to rotate, and the winding wheel 109 is driven to rotate through the friction between the rotatable piece 202 and the winding wheel 109, so that the winding wheel 109 winds up the electric wire 107. At the same time, the worker controls the spot welding machine body 103 to drive the first electrode holder 104 and the second electrode holder 105 away from an object with welding, and controls the spot welding machine body 103 to reverse to avoid the electric wire 107 from winding on the spot welding machine body 103, so that the winding wheel 109 can wind up the electric wire 107. In this way, the position of the display 111 can be avoided from being affected by the electric wire 107 being wound on the spot welding machine body 103, and the difficulty of viewing the display 111 by the workers can be avoided.

Example 2 of the Present Disclosure

On the basis of Example 1, referring to FIGS. 1, 2, 6 and 7, the suspended-type spot welding device convenient for welding and assembling of various vehicle models further includes a trigger frame 301, a fixing block 302, a first spring 303, a third fixing frame 304, a black lens 305 and a torsional spring 306; and a right front side of the first electrode holder 104 is fixedly connected to the fixing block 302, the trigger frame 301 is slidably connected inside the fixing block 302, and the first spring 303 is connected between the trigger frame 301 and the fixing block 302. A bottom of the trigger frame 301 is in contact with an inner side of the second electrode holder 105, a lower part of the camera 106 is fixedly connected to the third fixing frame 304, a lower part of the third fixing frame 304 is rotatably connected to the black lens 305 for protecting the camera 106, and the trigger frame 301 presses the black lens 305. The trigger frame 301 is in contact with the black lens 305, the trigger frame 301 may be separated from the black lens 305 through movement, the torsional spring 306 is connected between a left upper side of the black lens 305 and the third fixing frame 304, and the black lens 305 for protecting the camera 106 rotates to block the camera 106 under the action of the torsional spring 306.

To avoid the camera 106 from being damaged by spatter of welding slag generated during welding, it is necessary to protect the camera 106. Initially, the trigger frame 301 abuts against the black lens 305, and the torsional spring 306 is in a deformed state. When the spot welding machine body 103 controls the second electrode holder 105 to rotate and contact with the first electrode holder 104 to weld the welding seam, the second electrode holder 105 drives the trigger frame 301 to move upward, and the first spring 303 is compressed, so that the trigger frame 301 is separated from the black lens 305, and the torsional spring 306 is reset, thus driving the black lens 305 to rotate upward and block under the camera 106 and allowing the black lens 305 to protect the camera 106. When the second electrode holder 105 is reversely reset, the second electrode holder 105 is separated from the trigger frame 301, and the first spring 303 is reset to drive the trigger frame 301 to move downward and reset. The trigger frame 301 is in contact with the black lens 305 and presses the black lens 305 to rotate, and the torsional spring 306 is deformed, so that the black lens 305 can be separated when the welding seam is viewed. During welding, the black lens 305 rotates below the camera 106, so that the camera 106 can be avoided from being damaged by spatter of welding slag generated during welding, which does not affect the workers to see the welding seam clearly, but also can protect the camera 106.

Figure 7:
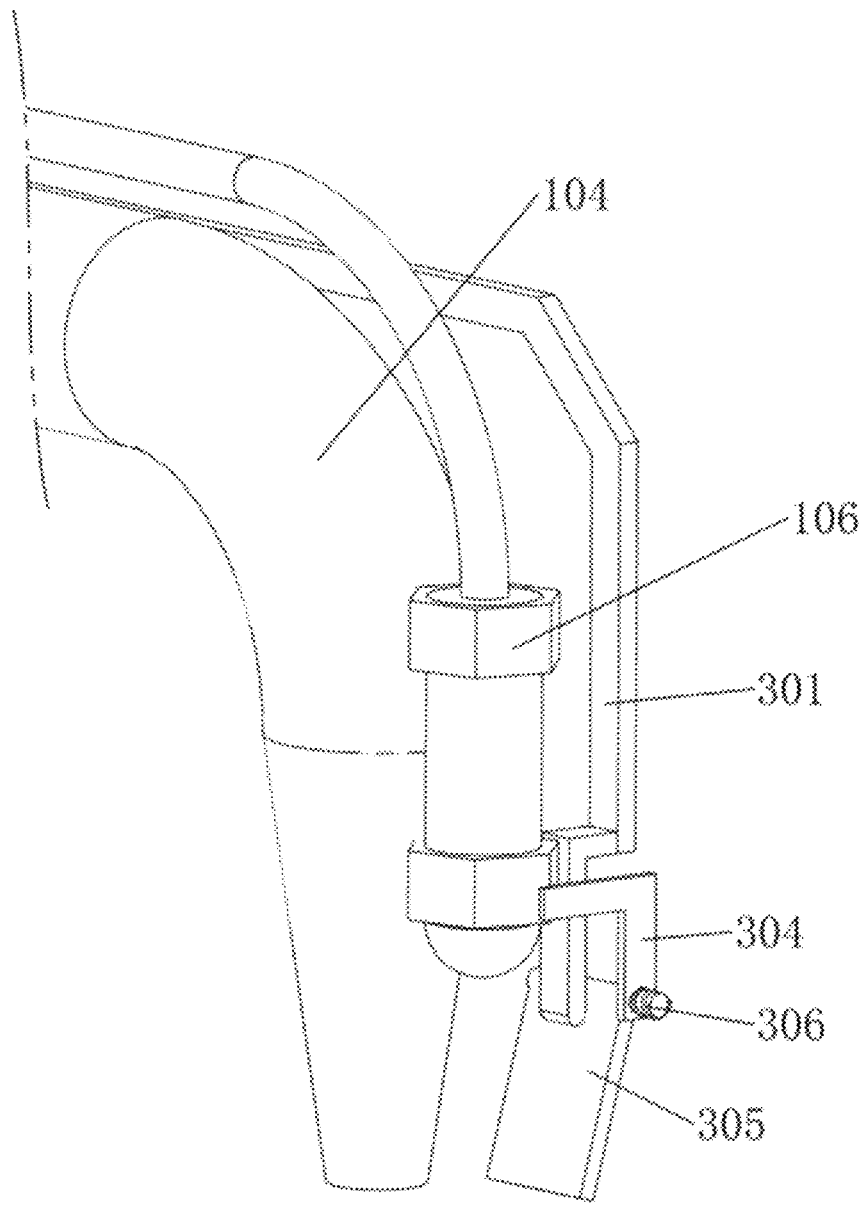
FIG. 7 is a schematic diagram of a three-dimensional structure of a black lens, a torsional spring, a third fixing frame and other parts of the present disclosure.
Figure 8:
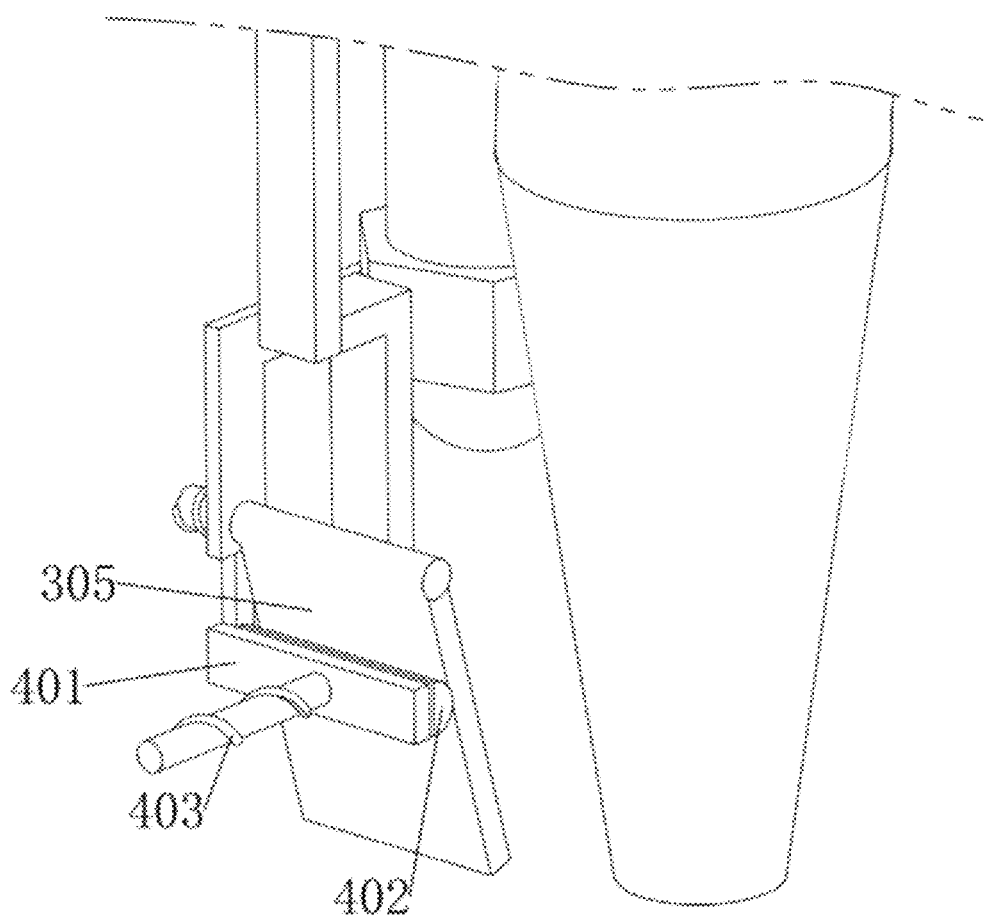
FIG. 8 is a schematic diagram of a three-dimensional structure of a fourth fixing frame, a wiping piece and other parts of the present disclosure.

Referring to FIGS. 1, 7 and 8, the suspended-type spot welding device convenient for welding and assembling of various vehicle models further includes a fourth fixing frame 401, a wiping piece 402 and a second spring 403; and a bottom of the third fixing frame 304 is fixedly connected to the fourth fixing frame 401, the fourth fixing frame 401 is slidably connected to the wiping piece 402 for wiping the black lens 305, the wiping piece 402 is made of transparent material and is in contact with a bottom of the black lens 305, and the second spring 403 is connected between the wiping piece 402 and the fourth fixing frame 401. Under the reset action of the second spring 403, the wiping piece 402 is driven to move to erase the welding slag adhered to the bottom of the black lens 305, to avoid that too much welding slag will affect the clarity of the black lens 305, and then affect the clarity of camera 106 shooting.

To avoid the spatter of welding slag generated during welding from adhering to the black lens 305, and the effect of the clarity of the black lens 305, the black lens 305 can be cleaned. Initially, the black lens 305 presses the wiping piece 402, and the second spring 403 is in a stretched state. When the black lens 305 rotates, the second spring 403 is reset, driving the wiping piece 402 to move, so that the welding slag adhered to a bottom of the black lens 305 can be erased by the wiping piece 402, to avoid that too much welding slag will affect the clarity of the black lens 305, thus affecting the clarity of the camera 106 shooting. When the black lens 305 is reversely reset, the contact between the black lens 305 and the wiping piece 402 drives the wiping piece 402 to move forward and reset, and the second spring 403 is stretched.

Figure 9:
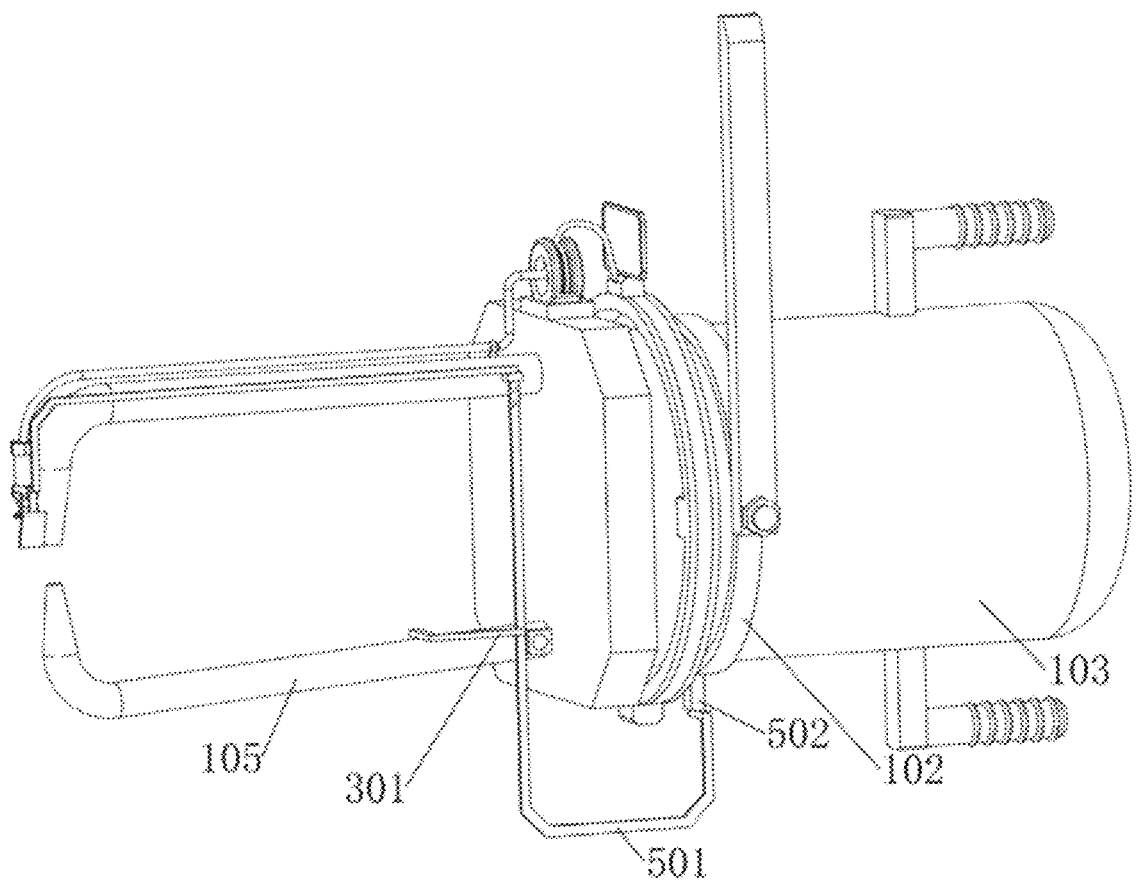
FIG. 9 is a schematic diagram of a three-dimensional structure of a connecting frame, a rubber block and other parts of the present disclosure.

Referring to FIGS. 1 and 9, the suspended-type spot welding device convenient for welding and assembling of various vehicle models also includes a connecting frame 501 and a rubber block 502. A bottom of the trigger frame 301 is fixedly connected to the connecting frame 501, and a lower part of the rotation piece 102 is slidably connected to the rubber block 502 for limiting the spot welding machine body 103. The rubber block 502 may move to contact with the spot welding machine body 103 for increasing the friction between the rubber block 502 and the spot welding machine body 103.

To avoid the spot welding machine body 103 from shaking during welding, and affecting the welding quality, the spot welding machine body 103 can be limited. During welding, when the second electrode holder 105 rotates, the trigger frame 301 is driven to move upwards, thus driving the connecting frame 501 to move upwards. The rubber block 502 is pushed by the connecting frame 501 upward to contact with the spot welding machine body 103, so that the spot welding machine body 103 can be limited under the action of the rubber block 502, and the rotation of the spot welding machine body 103 is avoided from affecting the welding quality.

Figure 4:
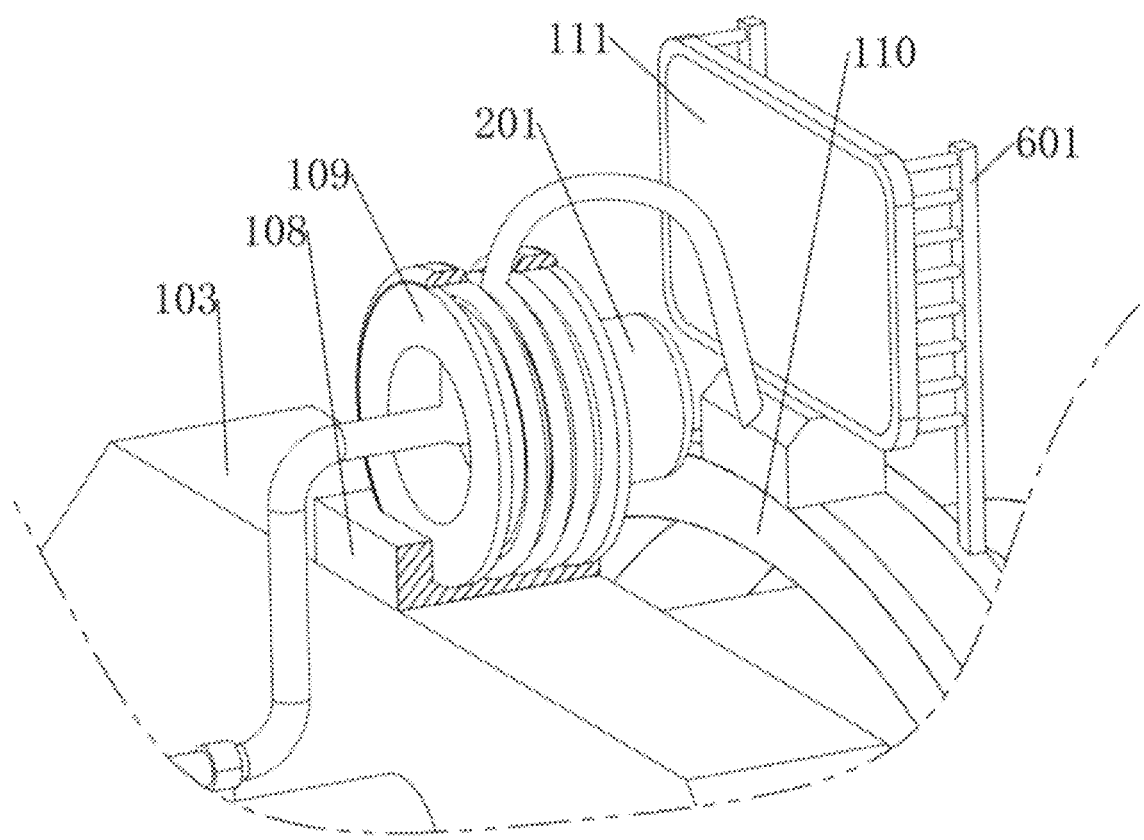
FIG. 4 is a schematic diagram of a three-dimensional structure of a first fixing frame, a second fixing frame and other parts of the present disclosure.
Figure 5:
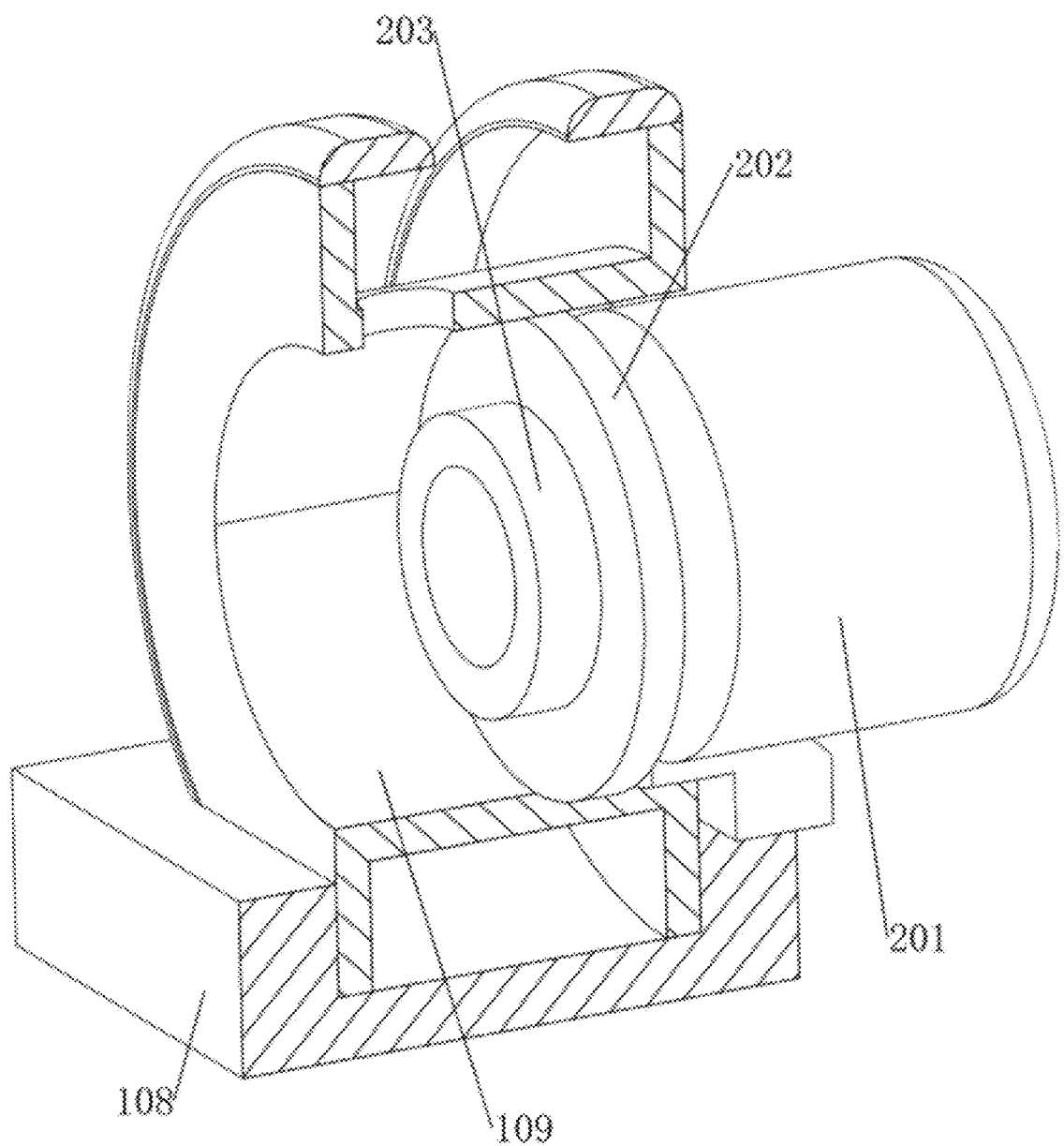
FIG. 5 is a schematic diagram of a three-dimensional structure of a motor, a rotatable piece, a counting sensor and other parts of the present disclosure.
Figure 6:
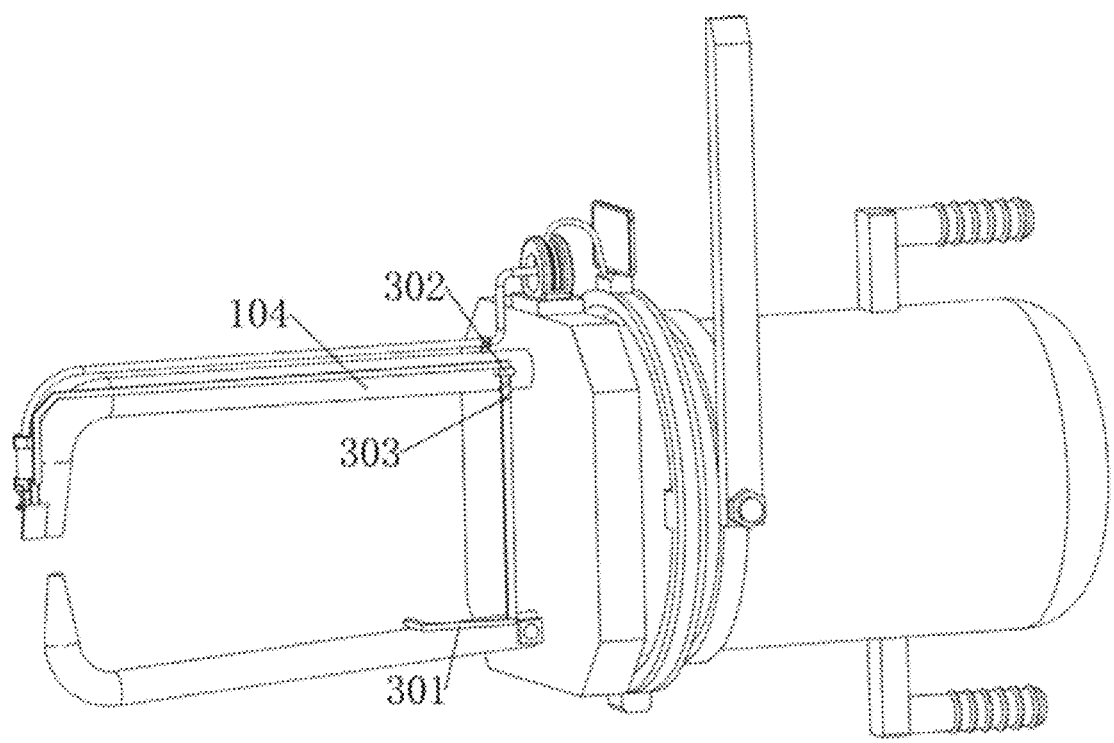
FIG. 6 is a schematic diagram of a three-dimensional structure of a trigger frame, a fixing block and other parts of the present disclosure.

Referring to FIG. 4, the suspended-type spot welding device convenient for welding and assembling of various vehicle models further includes dust cleaning brushes 601. Two dust cleaning brushes 601 are fixedly connected to a top of the second fixing frame 110, the display 111 rotates to contact with the dust cleaning brushes 601, and the dust cleaning brushes 601 are used for wiping the display 111.

To avoid dust attached to the display 111 and affect the clarity of the display 111, the dust attached to the display 111 can be cleaned under the action of the dust cleaning brushes 601 when the display 111 moves, so that it is unnecessary for workers to manually clean the display 111, and the clarity of the display 111 is ensured to prevent the workers from seeing the position of the welding seam unclearly.

The embodiments of the present disclosure have been described in detail with reference to the attached drawings, but the present disclosure is not limited to the above embodiments, and various changes can be made within the knowledge of those skilled in the art without departing from the spirit of the present disclosure.

The invention claimed is:

1. A suspended-type spot welding device convenient for welding and assembling of various vehicle models, comprising a suspension frame (101), a rotation piece (102), a spot welding machine body (103), a first electrode holder (104), a second electrode holder (105), a camera (106), an electric wire (107), a second fixing frame (110), a display (111) and a limit assembly, wherein the suspension frame (101) is rotatably connected to the rotation piece (102), the spot welding machine body (103) is rotatably connected inside the rotation piece (102), the spot welding machine body (103) is fixedly connected to the first electrode holder (104), and one side of the spot welding machine body (103) close to the first electrode holder (104) is rotatably connected to the second electrode holder (105); the first electrode holder (104) is mounted with the camera (106) for shooting a welding seam, one side of the spot welding machine body (103) close to the rotation piece (102) is fixedly connected to the second fixing frame (110), and the display (111) for displaying the welding seam condition and position is rotatably connected inside the second fixing frame (110); and the display (111) comprises a rotation ring (114) and a display screen (113), the electric wire (107) is connected between the display (111) and the camera (106), and the spot welding machine body (103) is arranged with the limit assembly for limiting the display (111);

the limit assembly comprises a first fixing frame (108), a winding wheel (109), a balancing weight (112) and a driving assembly; the balancing weight (112) for limiting the display (111) is fixedly connected to a bottom of the rotation ring (114) of the display (111); and the first fixing frame (108) is fixedly connected to a top of the spot welding machine body (103), the first fixing frame (108) is rotatably connected to the winding wheel (109) for winding the electric wire (107), the electric wire (107) is wound on the winding wheel (109), and the first fixing frame (108) is arranged with the driving assembly for avoiding excessive pay-off of the electric wire (107);

the driving assembly comprises a motor (201), a rotatable piece (202) and a counting sensor (203); and the motor (201) is mounted inside the first fixing frame (108), an output shaft of the motor (201) is fixedly connected to the rotatable piece (202), the rotatable piece (202) is in contact with an inner wall of the winding wheel (109) and used for driving the winding wheel (109) to rotate, the rotatable piece (202) is connected to the counting sensor (203), and the counting sensor (203) is electrically connected to the motor (201);

a trigger frame (301), a fixing block (302), a first spring (303), a third fixing frame (304), a black lens (305) and a torsional spring (306) are also comprised; the first electrode holder (104) is fixedly connected to the fixing block (302), the trigger frame (301) is slidably connected inside the fixing block (302), and the first spring (303) is connected between the trigger frame (301) and the fixing block (302); and the camera (106) is fixedly connected to the third fixing frame (304), the third fixing frame (304) is rotatably connected to the black lens (305) for protecting the camera (106), the trigger frame (301) presses the black lens (305), and the torsional spring (306) is connected between the black lens (305) and the third fixing frame (304);

the trigger frame (301) is in contact with the black lens (305), the trigger frame (301) may be separated from the black lens (305) through movement, and the black lens (305) rotates to block the camera (106) under the action of the torsional spring (306);

a fourth fixing frame (401), a wiping piece (402) and a second spring (403) are also comprised; and the third fixing frame (304) is fixedly connected to the fourth fixing frame (401), the fourth fixing frame (401) is slidably connected to the wiping piece (402) for wiping the black lens (305), and the second spring (403) is connected between the wiping piece (402) and the fourth fixing frame (401); and the wiping piece (402) is in contact with a bottom of the black lens (305), the black lens (305) rotates, and the wiping piece (402) moves along with the black lens (305) to erase welding slag attached to the bottom of the black lens (305).

2. The suspended-type spot welding device convenient for welding and assembling of various vehicle models according to claim 1, further comprising a connecting frame (501) and a rubber block (502); and the connecting frame (501) is fixedly connected to an end of the trigger frame (301), and one side of the rotation piece (102) close to the connecting frame (501) is slidably connected to the rubber block (502) for limiting the spot welding machine body (103).

3. The suspended-type spot welding device convenient for welding and assembling of various vehicle models according to claim 2, wherein the rubber block (502) is configured to contact with the spot welding machine body (103) for increasing the friction between the rubber block (502) and the spot welding machine body (103).

4. The suspended-type spot welding device convenient for welding and assembling of various vehicle models according to claim 3, further comprising dust cleaning brushes (601), and a top of the second fixing frame (110) is fixedly connected to symmetrically arranged dust cleaning brushes (601) for wiping the display (111).

\* \* \* \* \*